Oct. 18, 1927.
H. HEINICKE
1,646,247
APPARATUS FOR ASCERTAINING THE COMPOSITION OF GASEOUS MIXTURES
Filed May 16, 1924
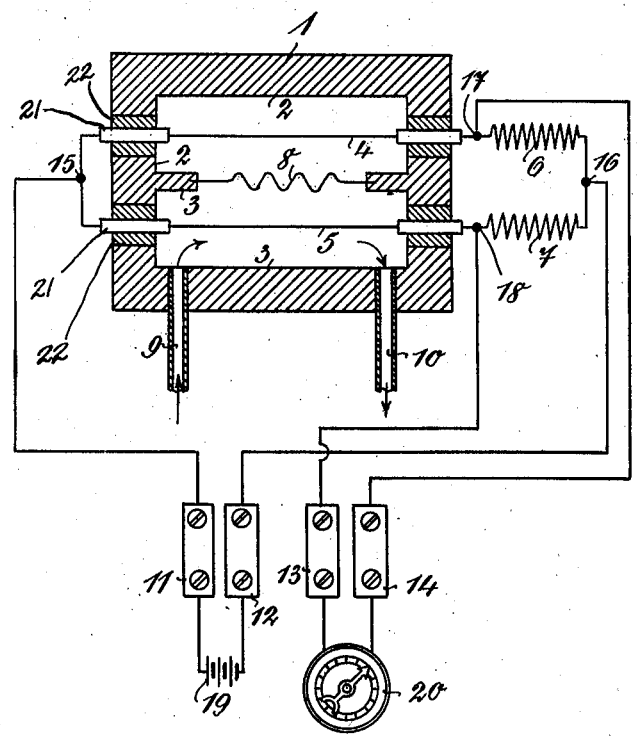
Witnesses:
Inventor:
Hermann Heinicke.
by
his Attorney.

Patented Oct. 18, 1927.

1,646,247

UNITED STATES PATENT OFFICE.

HERMANN HEINICKE, OF SEEHOF, NEAR TELTOW, GERMANY, ASSIGNOR TO PETER JUNG, OF NEUKOLLN, GERMANY.

APPARATUS FOR ASCERTAINING THE COMPOSITION OF GASEOUS MIXTURES.

Application filed May 16, 1924, Serial No. 713,838, and in Germany November 29, 1923.

My invention relates to improvements in apparatus for ascertaining the composition of gaseous mixtures, and more particularly in apparatus of the class based on the fact that the electric resistance of a thin wire surrounded by a gas and heated by a strong electric current depends on the heat conductivity of the surrounding gas or gaseous mixture, or in other words, the temperature and the ohmic resistance of the wire are varied in a degree corresponding to the character of the gas or gaseous mixture. Therefore the character of the gas or the composition of the gaseous mixture can be ascertained by measuring the resistance of the wire. In apparatus of this class the resistance is measured by means of an electric system corresponding to a Wheatstone bridge, opposite branches of the bridge consisting of thin wires having high temperature coefficients and being heated by a strong electric current of constant voltage. Preferably the said wires are made from a material such as nickel, iron, lead, platinum, etc. having low electric resistance and a high temperature coefficient, while the other branches of the bridge are made from materials such as manganin, nickelin, etc. having a very high electric resistance but a low temperature coefficient.

I have found that also adjacent branches of the bridge can be used as measuring wires, in which case, however, one of the branches must be surrounded by a suitable standard gas such as air. This, however, is objectionable for the reason that minute changes of pressure such as might be caused by the flow of the gas to be tested or by a change of the pressure of the atmosphere cause an error in the measurement. For this reason I dispose the said wires within two chambers one filled with the said standard gas and the other by the gas to be tested, and I provide means for insuring equal pressure in both chambers. Preferably the said chambers are provided within a casing divided by a flexible diaphragm into two chambers, so that the pressure is the same in both chambers.

For the purpose of explaining the invention an example embodying the same is shown diagrammatically in the accompanying drawing.

As shown in the said drawing a casing 1 made from a material of high conductivity for heat, such as copper or brass, is divided by a flexible and air tight diaphragm 8 into two chambers 2 and 3. The upper chamber 2 is filled with a suitable standard gas such as air and the chamber 3 has a supply line 9 and a discharge line 10 for the gas to be tested. The chambers 2 and 3 are traversed by wires 4 and 5 which are insulated from the wall of the casing 1 by being passed through short sections or rubber tubing or sleeves 21 bearing in ebonite or other insulating blocks 22 firmly held in the walls of the casing 1. The wires 4 and 5 consist of a material of relatively low ohmic resistance and high temperature coefficient, such as nickel, iron, lead, or platinum. The wires 4 and 5 are adjacent branches of a Wheatstone bridge, the other branches including compensating resistances 6 and 7 consisting of a material of high ohmic resistance and very low temperature coefficient, such as manganin, nickelin, etc., and adapted to render the instrument independent of the temperature of the surrounding air, as has been described in the German Patent No. 304796. The terminals 15 and 16 are connected to terminals 11 and 12 of a battery 19 and the terminals 17 and 18 to the terminals 13 and 14 of a galvanometer or indicating instrument 20.

In the operation of the system the chamber 2 is filled with the standard gas, and the gas to be tested is circulated through the chamber 3. Air is the standard gas ordinarily used in the chamber 2 and when the insulating blocks 22 with the sleeves 21 are placed in position the air then in chamber 2 is trapped therein and is under the same pressure as that which prevails in chamber 3. If a gas other than air is to be introduced into chamber 2, the blocks 22 with the sleeves 21 are removed from the casing, the air is exhausted or driven out of chamber 2, the desired gas introduced into chamber 2, and the blocks 22 and sleeves 21 reinserted in the casing 1. By the battery 19 electric current of constant pressure is supplied to the system, which heats the wire 5 to a temperature above that of the gas to be tested. Thereby the hand of the galvanometer shows values different from zero. As the cooling effect of the gas surrounding the wire 5 depends on the composition of the said gas, the scale marks of the galvanometer indicate the said composition.

The purpose and manner of using the device will be clear from the following:—If the composition of a gas is to be ascertained and the normal condition thereof is indicated by the hand of the galvanometer being stationary, when air is present in the chamber 2 and the gas to be tested is admitted through the tube 9 into the chamber 3 and passes out through the pipe 10, the hand will remain stationary if the gas is of normal composition. If the gas is not normal, the hand will move over the dial, but this movement is not due to any pressure differential in the chambers 2 and 3, as there is no pressure differential. The diaphragm 8 between the two chambers absolutely equalizes the pressure, and thus one of the most objectionable defects in measuring devices of this character is obviated.

Instead of using air as the measuring standard, the normal gas above referred to may be admitted to the chamber 2, and in that case if the gas which passes through the chamber 3 is of normal composition, the hand of the galvanometer would point to zero. If the gas passing through chamber 3 is not of normal composition the hand would move and experience would readily enable the observer to determine the meaning of a movement of the hand to the left or to the right of zero.

The apparatus is of particular utility in giving constant indication, as in the case of mines to indicate the presence of mine damp (a gas having a substantial methane content). The presence of mine damp or mine gas would materially modify the character or normal composition of the air in the mine, thereby causing a deflection of the galvanometer hand or indicator.

I claim:

1. An apparatus for ascertaining the composition of gaseous mixtures, comprising a chamber for containing a standard gas, a second chamber for containing the gaseous mixture, intact, means for automatically equalizing the pressure between the two chambers, and a Wheatstone bridge having branches extending, respectively, through said chambers.

2. An apparatus for ascertaining the composition of gaseous mixtures, comprising a casing containing two closely juxtaposed chambers adapted to contain, respectively, a standard gas and the gaseous mixture, a flexible diaphragm between said chambers for automatically equalizing the pressure between the chambers, and a Wheatstone bridge having branches extending, respectively, through said chambers.

In testimony whereof I hereunto affix my signature.

HERMANN HEINICKE.